United States Patent
Hiew et al.

(10) Patent No.: US 6,695,906 B2
(45) Date of Patent: *Feb. 24, 2004

(54) CONTINUOUS PROCESSES FOR PRODUCING TITANIUM DIOXIDE PIGMENTS

(75) Inventors: Michael Hiew, Ellicott City, MD (US); Yarw-Nan Wang, Ellicott City, MD (US); Les Hamor, Clifton Park, WA (US); Brian Tear, Grimsby (GB); Robert McIntyre, Lincolnshire (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/833,881

(22) Filed: Apr. 12, 2001

(65) Prior Publication Data

US 2002/0017221 A1 Feb. 14, 2002

Related U.S. Application Data

(60) Provisional application No. 60/196,684, filed on Apr. 12, 2000, and provisional application No. 60/196,856, filed on Apr. 12, 2000.

(51) Int. Cl.⁷ .................................................. C09C 1/36
(52) U.S. Cl. ....................................... 106/446; 106/442
(58) Field of Search .................................. 106/442, 446

(56) References Cited

U.S. PATENT DOCUMENTS

| | | | |
|---|---|---|---|
| 2,885,366 A | 5/1959 | Iler | |
| 2,913,419 A | 11/1959 | Alexander | |
| 3,437,502 A | 4/1969 | Werner | |
| 3,591,398 A | 7/1971 | Angerman | |
| 3,876,442 A | 4/1975 | Thomas | |
| 3,897,261 A | 7/1975 | Allen | |
| 4,075,031 A | 2/1978 | Allen | |
| 4,125,412 A | * 11/1978 | West | 106/446 |
| 5,041,162 A | 8/1991 | Brand | |
| 5,730,795 A | 3/1998 | Herkimer | |
| 5,993,533 A | * 11/1999 | Diebold et al. | 106/442 |
| 6,395,081 B1 | * 5/2002 | Hiew et al. | 106/446 |

FOREIGN PATENT DOCUMENTS

| | | | | |
|---|---|---|---|---|
| DE | 1 917 363 | 4/1969 | | |
| EP | 0073340 | 9/1983 | | |
| EP | 0412686 | 2/1991 | | |
| FR | 1442117 | 6/1966 | | |
| GB | 1179171 | 1/1970 | | |
| GB | 1207512 | 10/1970 | | |
| GB | 2271765 | 4/1994 | | |
| JP | 03-023221 | 6/1989 | | |
| WO | WO 89/09801 | * 10/1989 | | C09C/1/36 |
| WO | WO 93/22386 | 11/1993 | | |
| WO | WO 96/15197 | 5/1996 | | |

* cited by examiner

Primary Examiner—C. Melissa Koslow
Assistant Examiner—Shalie Manlove
(74) Attorney, Agent, or Firm—David Ari Kalow; William D. Schmidt; Kalow & Springut LLP

(57) ABSTRACT

Titanium dioxide pigments having improved gloss and durability are disclosed. These pigments are prepared by continuous processes, where pH, temperature, and addition times of hydrous silica and alumina coatings are carefully controlled.

29 Claims, No Drawings

CONTINUOUS PROCESSES FOR PRODUCING TITANIUM DIOXIDE PIGMENTS

This application claims the benefit of the filing date of U.S. Provisional Application No. 60/196,684, filed Apr. 12, 2000, entitled "Process for Producing Titanium Dioxide Pigments Possessing Improved Optical Properties Resulting from Low Temperature Processing" and U.S. Provisional Application No. 60/196,856, filed Apr. 12, 2000, entitled "Methods and Processes for Producing Titanium Dioxide Pigment Possessing Improved Physical Properties via Continuous Processing at High Rates", and U.S. application Ser. No. 09/705,530, filed, Nov. 3, 2000 entitled "Methods for Producing Titanium Dioxide Pigments having Improved Gloss at Low Temperatures," these entire disclosures are hereby incorporated by reference into the present disclosure.

FIELD OF INVENTION

This invention relates to improved processes for preparing titanium dioxide pigments by multistage continuous wet treatment characterized by short reaction times at low temperatures. Finished pigments prepared by the present processes are useful in various applications (i.e. paint, plastic coatings, etc.) and possess improved properties such as gloss and/or durability.

BACKGROUND OF THE INVENTION

Titanium dioxide ($TiO_2$) pigments are useful in a variety of applications such as paints, plastics and coatings. Generally pigments useful in these applications contain base $TiO_2$ particles (i.e., anatase or rutile) having layers or coatings of hydrous oxides of alumina, silica, zirconia, phosphates and the like.

Processes used to coat $TiO_2$ are well known in the pigmentary arts. These coating processes typically involve wet treating $TiO_2$ particles by precipitating certain hydrous oxides to form the desired coating.

Wet treatment of $TiO_2$ is performed using either batch processes or continuous multi-stage processes. Some prior art references describe advantages to continuous processes including reduced treatment times for hydrous oxide coating, and high product throughput without the need for substantial capital investment.

It is well known in the art that pH, temperature and wet treatment times performed on $TiO_2$ must be carefully controlled to produce fully coated pigment particles having desired physical properties (i.e., gloss and/or durability). Of the hydrous oxides, combinations of silica and alumina have proven to possess excellent properties in coatings applications. For example, pigments having dense silica coatings are well known to influence the optical properties and improve the durability of plastic, paint, or coating that it is used.

Continuous multistage processes to coat $TiO_2$ particles with hydrous silica and alumina are described in the prior art. Typically, these processes involve preparing an aqueous slurry of $TiO_2$ particles at temperatures of at least 80° C. and subsequently adding soluble silicates and alumina to the slurry.

The pH of the slurry is adjusted to at least about 9.6 to initiate the deposition of the hydrous silica layer. The prior art describes that in order to produce pigments with desirable silica coating, excessively long treatment times (i.e., over one hour or longer) and specific pH ranges are needed. For example, adequate dense silica coating is obtainable when slurry pH is lowered to about 9 through a series of steps designed to control the curing of the silica.

The prior art discloses that long treatment times and slurry pH are important to alumina deposition. For example, after curing the silica over one hour, alumina deposition is initiated by lowering the slurry pH to between about 5.5 and 7.5 by the addition of an alumina compound such as sodium aluminate. The reaction is allowed to proceed until such time as the desired amount of alumina has been deposited. Subsequently, the slurry is neutralized and washed. In a separate finishing step, the resulting pigment filter cake is finished by known means.

It has been discovered that in order to prepare $TiO_2$ pigments for paints, plastic and coatings having acceptable durability and/or gloss, that excessively long treatment times and higher treatment temperatures, typically greater than about 80° C. are unnecessary. These temperatures consume excessive energy, and are deleterious to the process. Thus, the present invention represents advancements in the art of continuous processes producing $TiO_2$ pigments having hydrous oxide coatings.

SUMMARY OF THE INVENTION

The present invention provides a continuous process for preparing titanium dioxide pigment comprising: a) preparing an aqueous slurry of titanium dioxide base particles at a temperature below about 75° C. and at a pH of from about 3.0 to about 9.0; b) adding a silica compound while maintaining the pH of the slurry in the range of from about 2.4 to about 10.5 and the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

In one embodiment, the present invention provides a continuous process for preparing a titanium dioxide pigment comprising: a) preparing an aqueous slurry of titanium dioxide base particles at a temperature below about 75° C. and at a pH from about 3.0 to about 8.0; b) adding a silica compound to coat the base titanium dioxide particles by maintaining the pH of the slurry in at least three stages, in the first stage the pH is maintained at about 10.0, in the second stage the pH is maintained at about 9.4, and in the third stage the pH is maintained at about 4.9, while maintaining the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

In another embodiment, the present invention provides a continuous process for preparing a titanium dioxide pigment comprising: a) preparing an aqueous slurry of titanium dioxide base particles at a temperature below about 75° C. and at a pH from about 3.0 to about 8.0; b) adding a silica compound to coat the base titanium dioxide particles by adjusting the pH of the slurry in at least three stages, in the first stage the pH is maintained at about 9.6, in the second stage the pH is maintained at about 8.9, and in the third stage the pH is maintained at about 2.7, while maintaining the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

In another embodiment, the present invention provides a continuous process for preparing a titanium dioxide pigment comprising: a) preparing an aqueous slurry of titanium dioxide base particles at a temperature below about 75° C. and at a pH from about 3.0 to about 8.0; b) adding a silica compound to coat the base titanium dioxide particles by adjusting the pH of the slurry in at least three stages, in the first stage the pH is maintained at about 9.5, in the second stage the pH is maintained at about 9.2, and in the third stage the pH is maintained at about 6.1, while maintaining the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

In yet another embodiment, the present invention provides a continuous process for preparing a titanium dioxide pigment comprising: a) preparing an aqueous slurry of unmilled titanium dioxide base particles at a temperature below about 75° C. and at a pH from about 2.0 to about 9.0; b) adding a silica compound to coat the base titanium dioxide particles by maintaining the pH of the slurry in at least three stages, in the first stage the pH is maintained at about 9.4, in the second stage the pH is maintained at about 9.1, and in the third stage the pH is maintained at about 5.0, while maintaining the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

In one exemplary embodiment, the present invention provides a continuous process for preparing a titanium dioxide pigment comprising: a) preparing an aqueous slurry of wet milled titanium dioxide base particles at a temperature below about 75° C. and at a pH from about 2.0 to about 9.0; b) adding a silica compound to coat the base titanium dioxide particles by maintaining the pH of the slurry in at least three stages, in the first stage the pH is maintained at about 9.1, in the second stage the pH is maintained at about 8.6, and in the third stage the pH is maintained at about 5.4, while maintaining the temperature of the slurry below about 75° C. so as to form silica coated base titanium dioxide particles in the slurry; and c) adding an alumina compound while maintaining the pH of the slurry in the range of from about 5.4 to about 7.5 and the temperature of the slurry below about 75° C. so as to form the titanium dioxide pigment.

In another exemplary embodiment, the present invention provides a continuous process for preparing titanium dioxide pigment comprising: a) preparing an aqueous slurry of titanium dioxide base particles at a temperature below about 75° C. and at a pH from about 3.0 to about 8.0; b) adding a silica compound to coat the base titanium dioxide particles by maintaining the pH of the slurry in at least three stages, in the first stage the pH is maintained at about 10.0, in the second stage the pH is maintained at about 9.4, and in the third stage the pH is maintained at about 4.9, while maintaining the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below about 75° C. so as to form the titanium dioxide pigment.

The pigments of the present invention can be prepared in a minimal amount of time, utilizing less overall heat energy than other continuous processes. The pigments of the present invention will have excellent gloss potential and compatibility with paints, plastics or coatings.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid understanding the present invention and are not intended to, and should not be construed to, limit the invention in any way. All alternatives, modifications and equivalents that may become obvious to those of ordinary skill on reading the disclosure are included within the spirit and scope of the present invention.

This disclosure is not a primer on $TiO_2$ pigment production, basic concepts known to those skilled in the field of $TiO_2$ production have not been set forth in detail. Concepts such as choosing appropriate additives and reactors for the oxidation reaction producing titania pigment are readily determinable by those skilled in the industry and are generally described in the prior art. Attention is therefore directed to the appropriate texts and references known to those skilled in the art in regard to these matters.

With a view to the present inventive process, $TiO_2$ pigment bases may be utilized. Such bases may include those commercially manufactured by either the "chloride" or "sulfate" process. The $TiO_2$ base particles useful in the present invention should preferably possess a substantially rutile crystalline structure. Such a base made by, for example, the chloride process will have a particle size range of from about 0.1 to about 0.5 microns. Typically, bases made via the chloride process contain a small amount of aluminum oxide which is added during the chloride process as, for example, aluminum chloride. The aluminum compound may be present in the $TiO_2$ pigment base in an amount of from about 0.1 to about 1.5 percent based on the titanium compound as is typically known in the art.

The present invention includes $TiO_2$ base obtained from the sulfate process, where titanium ore is dissolved in sulfuric acid to prepare an aqueous titanyl sulfate. This aqueous titanyl sulfate is hydrolyzed to titanium hydroxide and subsequently calcined to produce the base $TiO_2$. Both of these processes are well known in the art.

The base $TiO_2$ pigments useful in the processes of this invention can be wet milled, dry milled or unmilled and optionally hydroclassified prior to treatment, providing a pigment substrate of substantially uniform particle size.

As used herein unmilled base $TiO_2$ is an art recognized term and includes $TiO_2$ pigment that is not wet milled. Unmilled base $TiO_2$ pigment includes crude $TiO_2$ discharge product from the reactor in the chloride process or calciner in the sulfate process, where it was produced, which has not been subjected to any prior intervening processing step that substantially grinds, crushes, or mills the discharge product. Dry milled base $TiO_2$ is an art recognized term and includes dry milled or rolled $TiO_2$ discharge product from suitable dry milling or rolling processes, such as for example, Raymond milling, Sahout Conreur or Fitzpatrick rolling, and the like. Wet milling is an art recognized term and includes milling wet base $TiO_2$ discharge product. Some wet milling processes include sand milling, zircon bead milling, and the like.

The process of the present invention includes formation of an aqueous slurry of base titanium oxide pigment. Slurries of titanium dioxide pigment can be made by methods known in the art. Typically, the base pigment concentration will range from about 100 to about 500 grams per liter of slurry. This slurry is heated to a temperature of between about 60 to 75° C. by any means known in the art. Preferably, the slurry is heated to a temperature of between about 65 to below about 75° C. via steam injection, being fed in a continuous manner into the process reactor system.

The slurry pH can be adjusted by methods known in the art. For example, adjustment of pH is accomplished by adding a suitable acid or suitable base. Suitable bases include water-soluble alkaline bases such as ammonia, sodium hydroxide or other suitable alkaline compounds. Suitable acids include water soluble acids such as hydrochloric acid, sulfuric acid, nitric acid, and the like. The pH of the initial slurry (prior to addition of the silica compound) can be adjusted to between about 2 and about 11. Preferred pH of the initial slurry is between about 2 and about 9, most preferably from about 3 to about 8.

Following the formation of the initial slurry, a silica compound is added while the slurry is maintained at a temperature of below about 75° C. For purposes of the present invention, any water-soluble silica compound capable of providing silica for deposition upon the titanium dioxide pigment under the operating conditions of the process can be employed. Silica compounds suitable for use in the present invention include, but are not limited to, water-soluble alkali metal silicates. Preferred water-soluble alkali metal silicates include sodium silicate, potassium silicate, and the like. Most preferably, the silica compound is aqueous sodium silicate that provides $SiO_2$.

The silica compound is typically added directly into the reaction vessel in which the wet treatment takes place, or it can be added inline to the process. Preferably, the silica is added in an amount of from about 1 to about 10 weight percent, more preferably from about 1.5 to about 5.5 percent and most preferably from about 2.5 to about 3.5 percent, based on the weight of the $TiO_2$ pigment.

After the silica addition, the slurry is cured at pH ranges from typically about 10.5 to about 2.4. Preferably, the slurry is cured in at least three stages, for example, the pH is lowered in the first stage from about 10.2 to about 10.0, in the second stage, the pH is lowered to about 9.4, then in the third stage to about 4.9. Another preferred pH range includes lowering the pH in the first stage from about 10 to about 9.6, in the second stage, the pH is lowered to about 8.9, then in the third stage the pH is lowered to about 2.7. Another preferred pH range includes lowering the pH in the first stage from about 9.7 to about 9.5, in the second stage, the pH is lowered to about 9.2, then in the third stage the pH is lowered to about 6.1. Another preferred pH range includes lowering the pH in the first stage from about 9.6 to about 9.4, in the second stage, the pH is lowered to about 9.1, then in the third stage the pH is lowered to about 5.0. Another preferred pH range includes lowering the pH in the first stage from about 9.5 to about 9.1, in the second stage, the pH is lowered to about 8.6, then in the third stage the pH is lowered to about 5.4. The present invention contemplates similar pH profiles as well.

The residence time at each stage may also vary. Preferably, the residence time is kept to a minimum period of preferably about 15 minutes. For example, a sufficient amount of silica compound is added over 10 minutes, then the slurry is held for an additional period (preferably 5 minutes) prior to lowering the pH with each addition of acid. Alternatively, the silica compound is added in less than a minute, then the slurry is held for about 15 minutes prior to lowering the pH with additions of acid.

In one contemplated preferred embodiment, the present invention provides a continuous process where the slurry pH is between about 9.6 and about 9.8 in a first silica precipitation vessel. The slurry is allowed to cure where the residence time is preferably between about 10 and about 20 minutes prior to transferring the slurry to a second silica precipitation tank. In the second tank, the pH is lowered and maintained at between about 9.2 and 9.5. The residence time in the second tank is between about 10 and about 20 minutes prior to transferring the slurry to a third silica precipitation tank. In the third silica precipitation tank, additional acid is added to maintain the pH at a range of from about 2.4 to about 6.6.

Following the silica addition, an alumina compound is added while the slurry is maintained at a temperature of below about 75° C. Alumina compounds include hydrous alumina compounds such as for example, water soluble alkali metal aluminates. Some water soluble alkali metal aluminates, include but are not limited to sodium aluminate or potassium aluminate. Some other alumina compounds include aluminum sulfate, aluminum chloride, and the like. Most preferably, the water soluble alumina compound is sodium aluminate that provides $Al_2O_3$.

Preferably, the alumina compound is added to the slurry to provide $Al_2O_3$ equivalent to between about 1 and about 3% alumina by weight based on the weight of the titanium dioxide base pigment. Most preferably, the $Al_2O_3$ is equivalent to between about 1.6 to about 1.9% alumina based on the weight of the titanium dioxide base pigment.

Typically, the alumina compound is added to the slurry over between about 10 to about 20 minutes with simultaneous additions of either acid or base to maintain the pH below 7. Alternatively, the alumina compound is added in less than a minute, with simultaneous additions of either acid or base to maintain the pH below 7. Preferably, the pH is maintained at between about 5.5 and about 6.5 and the slurry is held for about 15 minutes prior to being discharged to a filter feed tank or directly to filters for washing.

The resultant silica and alumina coated titanium dioxide pigment is washed substantially free of soluble salts adhering to the pigment, dried and then subjected to final comminution using fluid energy milling techniques known in the art. Preferably, the washed and dried pigment is micronized in a steam micronizer at intensities known by those skilled in the art to produce the desired particle size distribution.

Optionally, an organic compound, polyol-like such as, for example, trimethylolpropane (TMP), trimethylolethane (TME), pentaerythritol, Tamol 1254, Tamol 963 and hydrophobic organics like organic phosphoric acids and silanes, can be added to the pigment during air or steam micronization. In the most preferred embodiment, TMP can be added in an amount of from about 0.2% to 0.8% based on the weight of the titanium dioxide pigment.

Titanium dioxide pigments of the present invention may be produced by a continuous process. Typically, continuous processes involve continuous feed pipelines with cascading treatment tanks with separate addition points for silica and alumina compounds, pH adjusters and other additives. Continuous processes involve residence times of less than about 120 minutes, preferably from about 5 minutes to about 60 minutes, and more preferably from about 10 minutes to about 45 minutes for silica and alumina deposition on the titanium dioxide pigment.

The coated pigments produced by the methods of the present invention will have good, dispersibility, gloss and/or durability. Dispersibility is determined by methods known in the art. For example, the coated titanium dioxide pigments of the present invention can be mixed in a plastic or paint and the distribution of the pigment particles measured. Uniform distribution of the pigment throughout the paint or plastic indicates good dispersibility, while agglomerate formation would indicate poor dispersibility of the pigment. Some methods of determining dispersibility known in the art include tinting strength, Hegman gauge, and the like.

Gloss is determined by methods known in the art. Preferably, the gloss is determined by incorporating the pigment into paint and measuring the gloss using a gloss meter. Durability of the pigments of the present invention can be determined by methods known in the art. Some methods of measuring durability include measuring photocatalytic activity of the titanium dioxide pigment, acid solubility of the titanium dioxide pigment, natural exposure and weatherometer testing.

Having now generally described the invention, the same may be more readily understood through the following reference to the examples, which are provided by way of illustration and are not intended to limit the present invention unless specified.

EXAMPLES

The examples below demonstrate that titanium dioxide pigments produced at temperatures below about 75° C. at the specific pH profile have commercially acceptable gloss and/or durability.

Example 1

Titanium dioxide base that has been wet milled to a particle size in the range of between about 0.2 and about 0.5 $\mu$m was used. Preferably, less than about 20% of the base was smaller than 0.5 $\mu$m in diameter. This material was diluted to have a specific gravity (density) of about 1.27, while 1000 g of $TiO_2$ was used for each surface treatment experiment. Slurry was heated, under agitation in an eight-liter battery jar, to 70–72° C., and then maintained at this temperature throughout the experiments.

Each experiment was carried out using identical conditions with the exception of initial slurry pH. 2.8% $SiO_2$ (based on the weight of $TiO_2$) was added as a solution of sodium silicate (about 380 g/l $SiO_2$) over a period of 20 minutes. The slurry was aged with agitation for additional 5 minutes, and then measurements of slurry pH and Brookfield viscosity (in centipoises, or cps) were performed.

After the addition of sodium silicate, the slurry pH was adjusted with HCl (about 20% concentrated) to pH of about 6.5±0.2 over a period of 15–30 minutes. The slurry was then aged with agitation for additional 10 minutes. A small quantity of slurry (less than 20 g of $TiO_2$) was withdrawn, immediately de-watered, and dried in a convection oven for tests for acid solubility, BET surface areas and transmission electron microscopy (TEM).

The impact of initial slurry pH (prior to addition of the sodium silicate) on the ease of processing (due to viscosity increases) and quality of the silica coating is depicted in Table 1 where the slurry viscosity after the addition of sodium silicate, along with acid solubility and BET surface areas of the silica-coated pigment, are summarized. It is shown that the lower initial slurry pH, preferably without the use of any NaOH, gives the best possible combination of ease of processing (lowest viscosity), quality of $SiO_2$ coating (lowest acid solubility and surface area).

TABLE 1

| Sample ID | Initial slurry pH Adjustment | Viscosity after $SiO_2$ Addition | $SiO_2$ Coating By TEM | Acid Solubility (in % $TiO_2$) | BET Surface Area (cm$^2$/g) |
| --- | --- | --- | --- | --- | --- |
| 9911-01 | Initial pH 3.4 (No NaOH), then add sodium silicate | ~400 centipoise | Good | 13.8% | 9.06 |
| 9911-02 | Initial pH 5.1 with NaOH, then add sodium silicate | ~450 centipoise | Good | 17.5% | 10.21 |
| 9910-01 | Initial pH 6.9 with NaOH, then add sodium silicate | ~580 centipoise | Good | 16.9% | 9.25 |
| 9911-03 | Initial pH 9.0 with NaOH, then add sodium silicate | ~600 centipoise | Poorer | 19.1% | 11.99 |
| 9911-04 | Initial pH 11.0 with NaOH, then add sodium silicate | ~670 centipoise | Very Poor | 14.5% | 11.72 |

Example 2

The same titanium dioxide base and the same experimental equipment were used. 1000 g of $TiO_2$ was used for each experiment. The slurry was diluted to have a specific gravity of 1.27, and was then heated to 70–72° C., under agitation in an eight-liter battery jar, and maintained at this temperature throughout the experiments.

Each experiment was carried out using identical conditions with the exception of end pH at which $SiO_2$ was precipitated. The initial slurry pH was at 7.0–7.4 with the addition of NaOH (about 50% by weight of concentration), with additional 10 minutes of aging with agitation. 2.8% $SiO_2$ (based on the weight of $TiO_2$) was added as a solution of sodium silicate (about 380 g/l $SiO_2$) over a period of 20 minutes. The slurry was then aged with agitation for additional 5 minutes.

In one experiment, after the addition of sodium silicate, the slurry pH was adjusted with HCl (about 20% by weight of concentration) to pH of about 5.0, over a period of 15 minutes. In another experiment, after the addition of sodium silicate, the slurry pH was adjusted with HCl to pH of about 5.0, over a period of 15 minutes.

The slurry was then aged with agitation for additional 5 minutes. A small quantity of this "$SiO_2$-only" pigment (less than 20 g of $TiO_2$) was withdrawn, immediately de-watered, and dried in a convection oven for tests for acid solubility, BET surface areas and transmission electron microscopy (TEM).

2.0% $Al_2O_3$ (based on the weight of $TiO_2$) was then added as a solution of sodium aluminate (about 370 g/l $Al_2O_3$) over a period of 10 minutes, while maintaining the slurry pH at 6.5 with simultaneous addition of HCl. The slurry was aged with agitation for additional 10 minutes.

Finally, the slurry pH was adjusted to 5.3±0.2 with HCl, and followed by additional 60 minutes of aging with agitation. The resulting pigment was then washed and filtered to substantially free of salt.

The pigment was blended with 0.4% trimethylolpropane (TMP) (based on $TiO_2$ weight), and then dried over 36 hours at about 100° C., crushed through an 8 mesh screen, and steam micronized using an 8 inch lab micronizer at steam:$TiO_2$ ratio of about 2.5. The pigment was then prepared into acrylic based paint at 40% PVC and the 20° gloss measured.

The end pH at which $SiO_2$ was precipitated, along with the quality of $SiO_2$ coating corresponding to samples taken after the $SiO_2$ addition stage, and the 40% acrylic gloss for the finished pigment are summarized in Table 2. It is shown here that reasonably good $SiO_2$ coatings with good gloss potential were achieved.

Example 3

The same titanium dioxide base, with the same experimental equipment and the same initial preparations were used as in Example 2. Each experiment was carried out using identical conditions with the exception of pH sequence by which SiO2 was precipitated.

Following the same procedure of SiO2 addition and aging as in Example 2, the slurry pH was adjusted in three steps with the addition of HCl. In one experiment, the pH was lowered in the first stage from about 10.2 to 10.0 over 1 minute, followed by about 15 minutes of aging, in the second stage from 10.0 to 9.4 over 1 minute, followed by about 15 minutes of aging, and then in the third stage from 9.4 to 4.9 over 1 minute, followed by about 15 minutes of aging. In another experiment with the same addition time and aging time, the pH was lowered in the first stage from 10.0 to 9.6, in the second stage from 9.6 to 8.9, and then in the third stage from 8.9 to 2.7.

After precipitation of SiO2, the pigment was treated with Al2O3 and then washed, filtered, blended with TMP, followed by drying, steam micronization, and prepared into the 40% PVC test in exactly the same manner as in Example 2.

The pH sequence by which SiO2 was precipitated, along with the quality of SiO2 coating corresponding to samples taken after the SiO2 addition stage, and the 40% acrylic gloss for the finished pigment are summarized in Table 2 below. It is shown here that improved quality of SiO2 coating (lower acid solubility value) and about equally good gloss potential was achieved with SiO2 precipitated over three stages and at lower pH.

TABLE 2

| | "SiO$_2$-only" Samples | | | | |
|---|---|---|---|---|---|
| Sample ID | SiO$_2$ Precipitation pH Sequence | Coating Quality by TEM | Acid Solubility | Surface Area | Finished Pigment 40% Acrylic Gloss |
| 001-06 | 10.2 → 5.0 | Good | 25.8% | 9.55 | 48 |
| 001-01 | 10.2 → 3.8 | Good | 28.7% | 11.2 | 54 |
| 001-07 | 10.2 → 10.0 → 9.4 → 4.9 | Good | 23.1% | 11.33 | 53 |

TABLE 2-continued

| | "SiO$_2$-only" Samples | | | | |
|---|---|---|---|---|---|
| Sample ID | SiO$_2$ Precipitation pH Sequence | Coating Quality by TEM | Acid Solubility | Surface Area | Finished Pigment 40% Acrylic Gloss |
| 001-02 | 10.0 → 9.6 → 8.9 → 2.7 | Good | 17.9% | 10.18 | 57 |

Example 4

The same experimental equipment, with the same slurry concentration and temperature were used as in Example 2. Titanium dioxide base was used without adjustments in the initial pH.

In one experiment, titanium dioxide base from the chloride process was used without wet milling. In another experiment, titanium dioxide base from the chloride process was wet milled in exactly the same manner as in Example 1. Following the same procedure of SiO$_2$ addition and aging as in Example 2, the slurry pH was adjusted with additions of HCl in the similar manner as in Example 3.

In the first experiment, pH was lowered in the first stage from about 9.6 to 9.4 over 1 minute, followed by about 15 minutes of aging, in the second stage from 9.4 to 9.1 over 1 minute, followed by about 15 minutes of aging, and then in the third stage from 9.1 to 5.0 over 1 minute, followed by about 15 minutes of aging. In the second experiment, the sequence of pH adjustments is from 9.5 to 9.1 in the first stage, from 9.1 to 8.6 in the second stage, and from 8.6 to 5.4 in the third stage, respectively.

After precipitation of SiO$_2$, the pigment was treated with Al$_2$O$_3$ and then washed, filtered, blended with TMP, followed by drying, steam micronization, and prepared into the 40% PVC test in exactly the same manner as in Example 2.

In Table 3 below, it is shown that the finished product manufactured using unmilled base from the chloride process gave rise to a slightly better quality of SiO$_2$ coating and gloss potential than that using the wet-milled base.

TABLE 3

| Sample ID | Base Pigment Conditions | SiO$_2$ Precipitation pH Sequence | SiO$_2$ Coating Quality by TEM | Finished Pigment | | |
|---|---|---|---|---|---|---|
| | | | | Acid Solubility | Surface Area | 40% Acrylic Gloss |
| 002-01 | Unmilled pH = 2.6 | 9.6 → 9.4 → 9.1 → 5.0 | Good | 21.4% | 16.85 | 38 |
| 002-02 | Wet Milled pH = 2.7 | 9.5 → 9.1 → 8.6 → 5.4 | Good | 23.5% | 17.51 | 34 |

Example 5

The same titanium dioxide bases, with the same slurry concentration and temperature were used as in Example 2. The wet treatment was carried out using a multi-tank continuous flow system, in which the SiO$_2$ treatment used four tanks, whereas Al$_2$O$_3$ treatment used one tank. The flow rate was precisely controlled to give about 15 minutes of residence time for slurry in each treatment tank.

In one experiment the initial slurry pH was adjusted to 7.1 with addition of NaOH in the first tank. After about 3.5% of $SiO_2$ was added in the second tank, the HCl was added simultaneously to the subsequent three consecutive tanks to give the slurry pH of 9.5, 9.2 and 6.1, respectively. The slurry viscosity increased noticeably after the $SiO_2$ addition as evidenced by the increasing r.p.m. of agitators required for maintaining a constant mixing of slurry.

Flowing into the next tank, about 2.7% of $Al_2O_3$ was added with HCl added simultaneously to maintain pH at 6.2. In the last tank, HCl was added to adjust the slurry pH to 6.7, and then was discharged for washing and filtering.

The resulting pigment was blended with TMP, followed by drying, steam micronization, and prepared into the 40% PVC test in exactly the same manner as in Example 2.

In another experiment, the initial slurry pH was at about 2.3 with no addition of NaOH in the first tank. Later, about 4.0% of $SiO_2$ was added in the second tank, the HCl was added simultaneously to the subsequent three consecutive tanks to give the slurry pH of 9.5, 9.2 and 6.1, respectively. The slurry maintained at a consistently low viscosity throughout the entire wet treatment, and no adjustment in r.p.m. was needed for the agitator.

Similarly when flowing into the next tank, about 3.3% of $Al_2O_3$ was added with HCl added simultaneously to maintain pH at 6.5. In the last tank, HCl was added to adjust the slurry pH to 6.2, and then was discharged for washing and filtering. Again, the resulting pigment was blended with TMP, followed by drying, steam micronization, and prepared into the 40% PVC test in exactly the same manner as in Example 2.

In Table 4, it is shown that adding sodium silicate directly to the base pigment (without initial pH adjustment) gives considerable low slurry viscosity, and therefore a remarkable advantage on the flow handling by the process equipment. The finished product (PP01–06) resulting from this process was shown to be equal in terms of the quality of $SiO_2$ coating and gloss potential compared to the slurry (PP01–05) where the initial pH was adjusted to 7.1.

TABLE 4

| Sample ID | Initial Slurry pH | Viscosity after $SiO_2$ Addition | Three-stage $SiO_2$ Precipitation pH Sequence | "$SiO_2$ only" samples Acid Solubility | "$SiO_2$ only" samples Surface Area | Finished Pigment 40% Acrylic Gloss |
|---|---|---|---|---|---|---|
| PP01-05 | 7.1 (with NaOH) | 424 centipoise | 9.7 → 9.5 → 9.2 → 6.1 | 9.8% | 13.65 | 52 |
| PP01-06 | 2.3 (no NaOH) | 77 centipoise | 9.7 → 9.5 → 9.2 → 6.1 | 9.2% | 12.67 | 45 |

Example 6
Titanium Dioxide Pigment Production

Titanium dioxide base having a particle size in the range of between about 0.1 and about 0.5 μm will be used. Preferably, less than about 20% of the base will be 0.5 μm particle size. This material will be mixed with water producing slurries having a specific gravity (density) of about 1.3 grams per milliliter. The contemplated continuous process is simulated using preferably three silica treatment tanks, and at least one alumina treatment tank. The slurry flow rate in each treatment tank will vary. Preferably, the slurry flow rate will be from about 130 to about 150 gallons per minute over a temperature range of between about 60° C. and about 75° C. The residence time in each tank will be at least five minutes, preferably from about 10 minutes to about 30 minutes. Sodium silicate will be added to the silica treatment tanks so as to maintain silica ($SiO_2$) at a weight of preferably between about 2.7% and about 3.0% by weight, based on the weight of $TiO_2$. Alumina will be added as sodium aluminate so as to maintain the alumina concentration of between about 1% and 3% by weight, based on the weight of $TiO_2$. Typically, HCl and NaOH will be utilized to control pH levels during the treatment process steps. Preferred pH profiles will be 10.0±0.2 pH units for the first silica treatment, 9.4±0.2 pH units for the second silica treatment tank, and 5.5 for the third treatment tank. The addition of the aluminum oxide is continuously controlled at a pH of about 6.0±0.5 pH units. The treatment times in each process step will be targeted to be at least 5 minutes, preferably about 10 to 30 minutes.

After the $TiO_2$ base particles are treated with silica and alumina, the resulting coated pigment will be filtered, washed and dried. Preferably, the pigment will be treated with from about 0.2% to about 0.4% trimethylolpropane (TMP) based on the weight of the titanium dioxide pigment. Subsequently, the treated pigment will be micronized in a fluid energy mill to produce a finished pigment. The resulting treated and micronized pigment will possess a particle size of preferably about 0.28 μm.

Example 7
20-Degree 40% PVC Acrylic Gloss Test Method

Pigment will be incorporated into a 40% PVC acrylic paint using a Synocryl 9122X resin. The prepared paint will be drawn down on glass panels using an automatic draw down device incorporating a 100-micron doctor blade. The paint panel will be allowed to dry in a dust free cabinet for a minimum of 5 hours before reading the 20-degree gloss values from a Glossgard II glossmeter. Up to 5 measurements will be recorded from each panel and the average result tallied. Preferably, pigment samples will display a 40% PVC 20 degree gloss value of between about 30 to about 55.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A continuous process for preparing a titanium dioxide pigment comprising: a) preparing an aqueous slurry of titanium dioxide base particles at a temperature below about 75° C. and at a pH of from about 2.0 to about 9.0; b) adding a silica compound while maintaining the pH of the slurry in the range of from about 2.4 to about 10.5 and the temperature of the slurry below about 75° C. so as to form silica coated base titanium dioxide particles in the slurry; and c) adding an alumina compound while maintaining the pH of the slurry in the range of from about 5.5 to about 7.5 and the temperature of the slurry below 75° C. so as to form the titanium dioxide pigment.

2. A process according to claim 1, wherein the slurry is prepared at a pH of from about 3.0 to about 8.0.

3. A process according to claim 1, wherein the slurry is maintained at the temperature of from about 60° C. to about 74° C. during the addition of the silica and alumina compounds.

4. A process according to claim 1, wherein the slurry is maintained at the temperature of about 70° C. during the addition of the silica and alumina compounds.

5. A process according to claim 1, wherein the slurry is maintained at the temperature of about 65° C. during the addition of the silica and alumina compounds.

6. A process according to claim 1, wherein the silica coated base titanium dioxide particles are formed by maintaining the pH of the slurry at about 10.0, then at about 9.4, and then at about 4.9.

7. A process according to claim 1, wherein the silica coated base titanium dioxide particles are formed by maintaining the pH of the slurry at about 9.6, then at about 8.9, and then at about 2.7.

8. A process according to claim 1, wherein the silica coated base titanium dioxide particles are formed by maintaining the pH of the slurry at about 9.5, then at about 9.2, and then at about 6.1.

9. A process according to claim 1, wherein the silica coated base titanium dioxide particles are formed by maintaining the pH of the slurry at about 9.4, then at about 9.1, and then at about 5.0.

10. A process according to claim 1, wherein the silica coated base titanium dioxide particles are formed by maintaining the pH of the slurry at about 9.1, then at about 8.6, and then at about 5.4.

11. A process according to claim 1, wherein the silica coated base titanium dioxide particles have a residence time of less than 30 minutes.

12. A process according to claim 1, wherein the silica coated base titanium dioxide particles have a residence time of less than 15 minutes.

13. A process according to claim 1, wherein the alumina compound is added at the pH of about 7.

14. A process according to claim 1, wherein the alumina compound is added at the pH of from about 5.5 to about 6.5.

15. A process according to claim 1, wherein after the alumina compound addition, the slurry has a residence time of less than 30 minutes.

16. A process according to claim 1, wherein after the alumina compound addition, the slurry has a residence time of less than 15 minutes.

17. A process according to claim 1, wherein the silica compound is sodium silicate.

18. A process according to claim 1, wherein the alumina compound is sodium aluminate.

19. A process according to claim 1, wherein the base titanium dioxide particles are anatase or rutile.

20. A process according to claim 1, wherein the base titanium dioxide particles are unmilled or wet milled.

21. A process according to claim 1, wherein the process further comprises: d) filtering, washing and drying the titanium dioxide pigment; and e) micronizing and treating the titanium dioxide pigment with an organic compound.

22. A process according to claim 21, wherein the organic compound is a polyol.

23. A process according to claim 22, wherein the polyol is trimethylolpropane.

24. A process according to claim 23, wherein the trimethylolpropane is added in an amount of from about 0.2% to about 0.8% based on the weight of the titanium dioxide pigment.

25. A continuous process for preparing a titanium dioxide pigment comprising: a) preparing an aqueous slurry of titanium dioxide base particles at a temperature below about 75° C. and at a pH from about 3.0 to about 8.0; b) adding a silica compound to coat the base titanium dioxide particles by maintaining the pH of the slurry in at least three stages, in the first stage the pH is maintained at about 10.0, in the second stage the pH is maintained at about 9.4, and in the third stage the pH is maintained at about 4.9, while maintaining the temperature of the slurry below 75° C. so as to form silica coated base titanium dioxide particles in the slurry; and c) adding an alumina compound while maintaining the pH of the slurry in the range of from about 5.5 to about 7.5 and the temperature of the slurry below 75° C. so as to form the titanium dioxide pigment.

26. A continuous process for preparing a titanium dioxide pigment comprising: a) preparing an aqueous slurry of titanium dioxide base particles at a temperature below 75° C. and at a pH from about 3.0 to about 8.0; b) adding a silica compound to coat the base titanium dioxide particles by adjusting the pH of the slurry in at least three stages, in the first stage the pH is maintained at about 9.6, in the second stage the pH is maintained at about 8.9, and in the third stage the pH is maintained at about 2.7, while maintaining the temperature of the slurry below 75° C. so as to form silica coated base titanium dioxide particles in the slurry; and c) adding an alumina compound while maintaining the pH of the slurry in the range of from about 5.5 to about 7.5 and the temperature of the slurry below 75° C. so as to form the titanium dioxide pigment.

27. A continuous process for preparing a titanium dioxide pigment comprising: a) preparing an aqueous slurry of titanium dioxide base particles at a temperature below 75° C. and at a pH from about 3.0 to about 8.0; b) adding a silica compound to coat the base titanium dioxide particles by adjusting the pH of the slurry in at least three stages, in the first stage the pH is maintained at about 9.5, in the second stage the pH is maintained at about 9.2, and in the third stage the pH is maintained at about 6.1, while maintaining the temperature of the slurry below 75° C. so as to form silica coated base titanium dioxide particles in the slurry; and c) adding an alumina compound while maintaining the pH of the slurry in the range of from about 5.5 to about 7.5 and the temperature of the slurry below 75° C. so as to form the titanium dioxide pigment.

28. A continuous process for preparing a titanium dioxide pigment comprising: a) preparing an aqueous slurry of unmilled titanium dioxide base particles at a temperature below 75° C. and at a pH from about 2.0 to about 9.0; b) adding a silica compound to coat the base titanium dioxide particles by maintaining the pH of the slurry in at least three stages, in the first stage the pH is maintained at about 9.4, in the second stage the pH is maintained at about 9.1, and in the third stage the pH is maintained at about 5.0, while maintaining the temperature of the slurry below 75° C. so as to form silica coated base titanium dioxide particles in the slurry; and c) adding an alumina compound while maintaining the pH of the slurry in the range of from about 5.5 to about 7.5 and the temperature of the slurry below 75° C. so as to form the titanium dioxide pigment.

29. A continuous process for preparing a titanium dioxide pigment comprising: a) preparing an aqueous slurry of wet milled titanium dioxide base particles at a temperature below 75° C. and at a pH from about 2.0 to about 9.0; b) adding a silica compound to coat the base titanium dioxide particles by maintaining the pH of the slurry in at least three stages, in the first stage the pH is maintained at about 9.1, in the second stage the pH is maintained at about 8.6, and in the third stage the pH is maintained at about 5.4, while main taining the temperature of the slurry below 75° C. so as to form silica coated base titanium dioxide particles in the slurry; and c) adding an alumina compound while maintaining the pH of the slurry in the range of from about 5.4 to about 7.5 and the temperature of the slurry below 75° C. so as to form the titanium dioxide pigment.

* * * * *

UNITED STATES PATENT AND TRADEMARK OFFICE
CERTIFICATE OF CORRECTION

PATENT NO.    : 6,695,906 B2
DATED         : February 24, 2004
INVENTOR(S)   : Michael Hiew et al.

It is certified that error appears in the above-identified patent and that said Letters Patent is hereby corrected as shown below:

Title page,
Item [75], Inventors, "(US)" should read -- (AU) --

Signed and Sealed this

Twenty-first Day of September, 2004

JON W. DUDAS
*Director of the United States Patent and Trademark Office*